United States Patent
Onogi et al.

(10) Patent No.: US 10,570,814 B2
(45) Date of Patent: Feb. 25, 2020

(54) WASTE-GATE VALVE AND TURBOCHARGER

(71) Applicant: MITSUBISHI HEAVY INDUSTRIES ENGINE & TURBOCHARGERS, LTD., Sagamihara-shi, Kanagawa (JP)

(72) Inventors: Takuma Onogi, Tokyo (JP); Yuta Ishii, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 220 days.

(21) Appl. No.: 15/555,230

(22) PCT Filed: Mar. 5, 2015

(86) PCT No.: PCT/JP2015/056520
§ 371 (c)(1),
(2) Date: Sep. 1, 2017

(87) PCT Pub. No.: WO2016/139800
PCT Pub. Date: Sep. 9, 2016

(65) Prior Publication Data
US 2018/0355789 A1 Dec. 13, 2018

(51) Int. Cl.
*F02B 37/18* (2006.01)
*F01D 17/10* (2006.01)

(52) U.S. Cl.
CPC .......... *F02B 37/186* (2013.01); *F01D 17/105* (2013.01); *F05D 2220/40* (2013.01); *F05D 2250/14* (2013.01)

(58) Field of Classification Search
CPC ...... F02B 37/186; F02B 37/183; F02B 37/18; F01D 17/105; F05D 2220/40;
(Continued)

(56) References Cited

U.S. PATENT DOCUMENTS 1,357,389 A * 11/1920 Evans .................. F16B 39/108
411/201
2,244,930 A * 6/1941 Wallgren ................ F16B 39/10
411/131
(Continued)

FOREIGN PATENT DOCUMENTS

CN 104047708 A 9/2014
DE 44 39 432 C1 11/1995
(Continued)

OTHER PUBLICATIONS

Office Action dated Jun. 29, 2018 issued to the corresponding JP Application No. 2017-503292 with an English Translation.
(Continued)

*Primary Examiner* — Thai Ba Trieu
(74) *Attorney, Agent, or Firm* — Birch, Stewart, Kolasch & Birch, LLP

(57) ABSTRACT

A waste-gate valve is for opening and closing a bypass passage which bypasses an exhaust turbine of a turbocharger, and includes: a valve body disposed in the bypass passage; an open-close lever having a first insertion hole into which a valve shaft of the valve body is inserted, and being configured to open and close the bypass passage by moving the valve body; and a washer having a second insertion hole which is positioned closer to a tip of the valve shaft than the first insertion hole and into which the valve shaft is inserted, the washer being fixed to the valve shaft. The washer has a bend portion bended along an outer shape of the open-close lever.

2 Claims, 9 Drawing Sheets

(58) Field of Classification Search
CPC .......... F05D 2250/10; F05D 2250/131; F05D 2250/14; F05D 2260/31; F05D 2260/36; Y02T 10/144; F16B 39/10; F16B 39/16
USPC ............................................. 60/602; 411/131
IPC ...................................................... F16B 39/10
See application file for complete search history.

(56) References Cited

U.S. PATENT DOCUMENTS

| | | | | |
|---|---|---|---|---|
| 5,275,193 | A * | 1/1994 | Wright | F16K 17/386 137/75 |
| 9,593,624 | B2 | 3/2017 | Segawa | |
| 2006/0243259 | A1 | 11/2006 | Takahashi | |
| 2012/0292547 | A1 | 11/2012 | Kierat et al. | |
| 2014/0069094 | A1 * | 3/2014 | Marsal | F01D 25/162 415/229 |
| 2014/0366531 | A1 * | 12/2014 | Segawa | F02B 37/186 60/602 |
| 2015/0147162 | A1 * | 5/2015 | Stilgenbauer | F02B 37/186 415/145 |
| 2015/0166191 | A1 * | 6/2015 | Cassagne | F16B 39/10 244/54 |
| 2015/0285133 | A1 | 10/2015 | Byon | |
| 2015/0337863 | A1 | 11/2015 | Tomita et al. | |

FOREIGN PATENT DOCUMENTS

| | | | | |
|---|---|---|---|---|
| DE | 10 2010 007 600 A1 | 8/2011 | | |
| DE | 10 2011 075450 A1 * | 11/2012 | ............ | F02B 37/183 |
| JP | 5-14544 U | 2/1993 | | |
| JP | 6-330924 A | 11/1994 | | |
| JP | 7-19065 A | 1/1995 | | |
| JP | 2006-30774 A | 11/2006 | | |
| JP | 2012-17714 A | 1/2012 | | |
| JP | 2013-2431 A | 1/2013 | | |
| JP | 2013-519813 A | 5/2013 | | |
| JP | 2013-204495 A | 10/2013 | | |
| WO | WO-8706659 A1 * | 11/1987 | ............ | F16B 39/16 |
| WO | WO 2013/022598 A1 | 2/2013 | | |
| WO | WO 2013/133376 A1 | 9/2013 | | |
| WO | WO-2014011468 A1 * | 1/2014 | ............ | F02B 37/186 |
| WO | WO 2014/128939 A1 | 8/2014 | | |
| WO | WO 2014/171239 A1 | 10/2014 | | |

OTHER PUBLICATIONS

Office Action dated Jan. 18, 2019 issued in the corresponding Chinese Application No. 201580077407.7.
Office Action dated Oct. 18, 2018 issued to the corresponding EP Application No. 15883967.0.
Office Action dated Oct. 26, 2018 issued to the corresponding Japanese Application No. 2017-503292 with an English Translation.
Extended European Search Report dated Nov. 24, 2017 issued to the corresponding EP Application No. 15883967.0.
International Preliminary Report on Patentability and Written Opinion of the International Searching Authority (Forms PCT/IB/338, PCT/IB/373, PCT/ISA/237 and PCT/IB/326) in International Application No. PCT/JP2015/056520 dated Sep. 14, 2017, together with an English translation.
International Search Report and Written Opinion of the International Searching Authority (Forms PCT/ISA/210 and PCT/ISA/237) issued in International Application No. PCT/JP2015/056520 dated May 19, 2015.
Office Action dated Dec. 19, 2019 issued to the corresponding European Application No. 15883967.0.

* cited by examiner

WASTE-GATE VALVE AND TURBOCHARGER

TECHNICAL FIELD

The present disclosure relates to a waste-gate valve and a turbocharger.

BACKGROUND ART

In some cases, a turbocharger is provided with a waste-gate valve to suppress an excessive increase in the boost pressure. The waste-gate valve adjusts the inflow amount of exhaust gas to an exhaust turbine by opening and closing a bypass passage that bypasses an exhaust turbine of a turbocharger.

A type of such waste-gate valve opens and closes the bypass passage by moving a valve body with an open-close lever, in case of which, for instance, the open-close lever and the valve body are coupled by inserting a valve shaft of the valve body into an insertion hole of the open-close lever, and providing a stopper (e.g. swaging part or washer) for the tip of the valve shaft. In this type of waste-gate valve, the valve body rotates about the axis of the valve shaft due to an influence from vibration of the engine or exhaust pulsation and makes slide-contact with the insertion hole of the open-close lever or the valve seat, and thus abrasion is likely to occur at the portion in contact with the valve body.

The waste-gate valve described in Patent Document 1 is provided with a groove having a rotation stopping surface in the insertion hole of the open-close lever (operation lever) to limit rotation of the valve body about the axis of the valve shaft described above, and a rotation-stopping washer having a side surface to contact the rotation stopping surface is engaged with the groove and, the washer is fixed to the valve shaft.

CITATION LIST

Patent Literature

Patent Document 1: JPH7-19065A

SUMMARY

Problems to be Solved

In the waste-gate valve described in Patent Document 1, it is necessary to form a groove having a rotation stopping surface on the open-close lever to limit rotation of the valve body about the axis of the valve shaft. Thus, the configuration of the open-close lever is complex, causing an increase in the production costs of the waste-gate valve.

The present invention was made in view of the above problem of typical art, and an object of the present invention is to provide a waste-gate valve capable of restricting rotation of a valve body about the axis of a valve shaft and simplifying the configuration of the open-close lever, and a turbocharger provided with the waste-gate valve.

Solution to the Problems (1) A waste-gate valve, according to at least one embodiment of the present invention, is for opening and closing a bypass passage which bypasses an exhaust turbine of a turbocharger, and comprises: a valve body disposed in the bypass passage; an open-close lever having a first insertion hole into which a valve shaft of the valve body is inserted, and being configured to open and close the bypass passage by moving the valve body; and a washer having a second insertion hole which is positioned closer to a tip of the valve shaft than the first insertion hole and into which the valve shaft is inserted, the washer being fixed to the valve shaft. The washer has a bend portion bended along an outer shape of the open-close lever.

With the above waste-gate valve (1), even if vibration of an engine and vibration due to exhaust pulsation are transmitted to the valve body, the bend portion of the washer fixed to the valve body hangs on the open-close lever, and thereby it is possible to restrict rotation of the valve body. Thus, it is possible to suppress development of abrasion on a portion in contact with the valve body, and to improve the lifetime of the waste-gate valve. Furthermore, it is not necessary to form a groove having a rotation stopping surface as described in Patent Document 1 on the open-close lever, and thus it is possible to simplify the configuration of the open-close lever. Furthermore, in general, the washer can be formed by the drawing process. Thus, for instance, as compared to a case in which a protrusion to hang on the open-close lever is formed on the valve body by precision casting, it is possible to enhance reliability of the product while suppressing an increase in the production costs. "The bend portion" in the above (1) may be a "curved portion (smoothly bending portion)", or "flex portion (folded portion)".

(2) In some embodiments, in the above waste-gate valve (1), the open-close lever has a corner portion extending in one direction, and the bend portion of the washer is bended along a ridge of the corner portion.

With the waste-gate valve described in the above (2), the bend portion of the washer can hang on the corner portion of the open-close lever more easily, and thereby it is possible to restrict rotation of the valve body effectively.

(3) In some embodiments, in the above waste gate valve described in the above (1) or (2), the washer is fixed to the valve shaft by swaging a tip portion of the valve shaft. The second insertion hole has a non-circular shape as seen in an axial direction of the second insertion hole.

With the above waste-gate valve (3), the tip portion of the valve shaft is swaged, and thus it is possible to cause the tip portion of the valve shaft enter the second insertion hole, and thus to enhance the strength of the swaging portion with respect to torque.

(4) In some embodiments, in the waste-gate valve described in the above (3), the second insertion hole includes a serration shape as seen in the axial direction of the second insertion hole.

With the above waste-gate valve (4), the tip portion of the valve shaft is swaged, and thus it is possible to cause the tip portion of the valve shaft to enter the second insertion hole including a serration shape effectively. Thus, it is possible to enhance the effect to improve the strength of the swaging portion with respect to torque.

(5) In some embodiments, in the waste-gate valve described in the above (3), the shape of the second insertion hole is an oval shape as seen in the axial direction of the second insertion hole.

With the above waste-gate valve (5), the tip portion of the valve shaft is swaged, and thus it is possible to cause the tip portion of the valve shaft to enter the second insertion hole having an oval cross section, thereby enhancing the strength of the swaging portion with respect to torque with a simple washer configuration.

(6) In some embodiments, in the waste-gate valve described in the above (5), a section of the valve shaft which is inserted into the insertion hole of the washer has an oval shape as seen in the axial direction of the valve shaft.

With the above waste-gate valve (6), the tip portion of the valve shaft is swaged, and thus it is possible to cause the tip portion of the valve shaft having an oval cross section enter the second insertion hole having an oval cross section effectively, and thus to improve the effect to enhance the strength of the swaging portion 36 with respect to torque.

(7) In some embodiments, in the waste-gate valve described in any one of the above (1) to (6), the open-close lever has a step portion on a surface adjacent to the washer. The washer has a side surface formed so as to restrict rotation of the washer about an axis of the valve shaft by making contact with the step portion.

With the above waste-gate valve (7), even if vibration of an engine and vibration due to exhaust pulsation are transmitted to the valve body, the side surface of the washer makes contact with the step portion of the open-close lever, and thereby it is possible to restrict rotation of the valve body fixed to the washer. Furthermore, in general, the washer can be formed by the drawing process. Thus, for instance, as compared to a case in which a protrusion to hang on the open-close lever is formed on the valve body by precision casting, it is possible to enhance reliability of the product while suppressing an increase in the production costs. The side surface of the washer can be formed easily by cutting the washer having an annular shape along a plane parallel to the axis of the insertion hole.

(8) In some embodiments, in the waste-gate valve described in any one of the above (1) to (6), the open-close lever has a step portion on a surface adjacent to the valve body. The valve body has a step portion facing the step portion of the open-close lever on a surface adjacent to the open-close lever. The step portion of the valve body is formed so as to restrict rotation of the valve body about an axis of the valve shaft by making contact with the step portion of the open-close lever.

With the above waste-gate valve (8), even if vibration of an engine and vibration due to exhaust pulsation are transmitted to the valve body, the step portion of the valve body makes contact with the step portion of the open-close lever, and thereby it is possible to restrict rotation of the valve body. Further, with this configuration, an increase in torque applied to the connection part between the valve shaft and the washer is suppressed, and thus it is possible to suppress breakage of the swaging portion due to torque in a case where the tip portion of the valve shaft is fixed to the washer by swaging. Furthermore, the step portion of the valve body can be formed easily by a cutting process on the valve body. Thus, for instance, as compared to a case in which a protrusion to hang on the open-close lever is formed on the valve body by precision casting, it is possible to enhance reliability of the product while suppressing an increase in the production costs.

(9) A turbocharger according to at least one embodiment of the present invention comprises: an exhaust turbine configured to be rotated by exhaust gas of an engine; a compressor configured to be driven by the exhaust turbine and compress intake air of the engine; and the waste-gate valve according to any one of (1) to (8).

With the above turbocharger (9), provided with the waste-gate valve described in any one of the above (1) to (8), it is possible to restrict rotation of the valve body about the axis of the valve shaft in the waste-gate valve and to simplify the configuration of the open-close lever. That is, it is possible to suppress development of abrasion of a portion in contact with the valve body in the waste-gate valve with a simple configuration. In this way, it is possible to achieve stable operation of the turbocharger with a simple configuration for a long time.

Advantageous Effects

According to at least one embodiment of the present invention, provided is a waste-gate valve capable of restricting rotation of a valve body about the axis of a valve shaft while having an open-close lever of a simplified configuration, and a turbocharger provided with the waste-gate valve.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
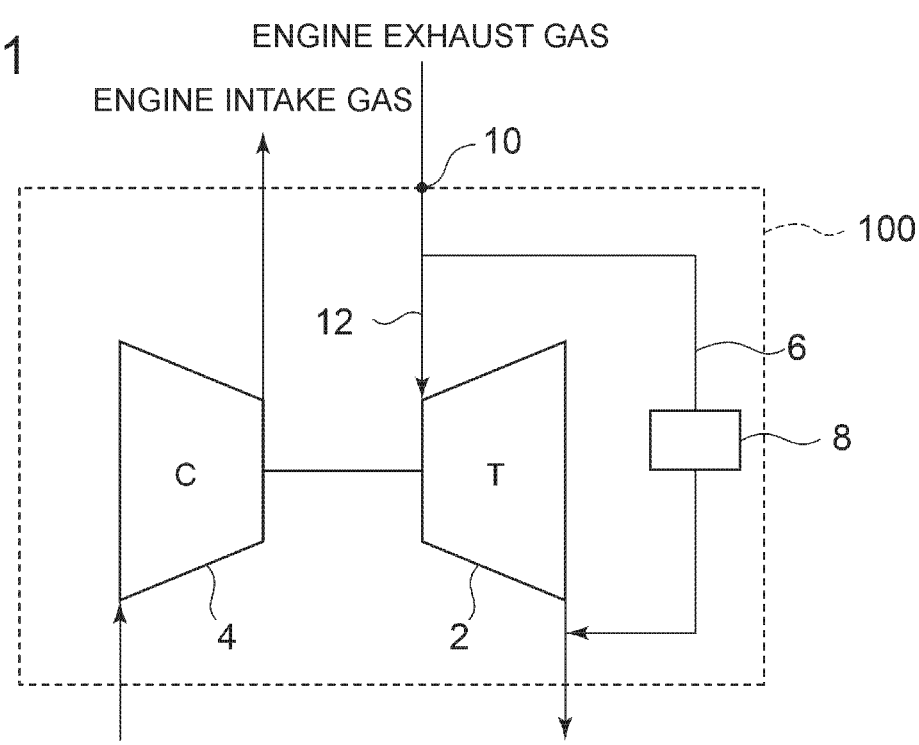
FIG. 1 is a schematic block configuration diagram of a turbocharger according to an embodiment.

FIG. 1 is a schematic configuration diagram of a turbocharger 100 according to an embodiment. As shown in FIG. 1, the turbocharger 100 includes an exhaust turbine 2 configured to be rotated by exhaust gas of an engine (not shown), a compressor 4 driven by the exhaust turbine 2 to compress intake air of the engine, and a waste-gate valve 8 for opening and closing a bypass passage 6 bypassing the exhaust turbine 2.

Figure 2:
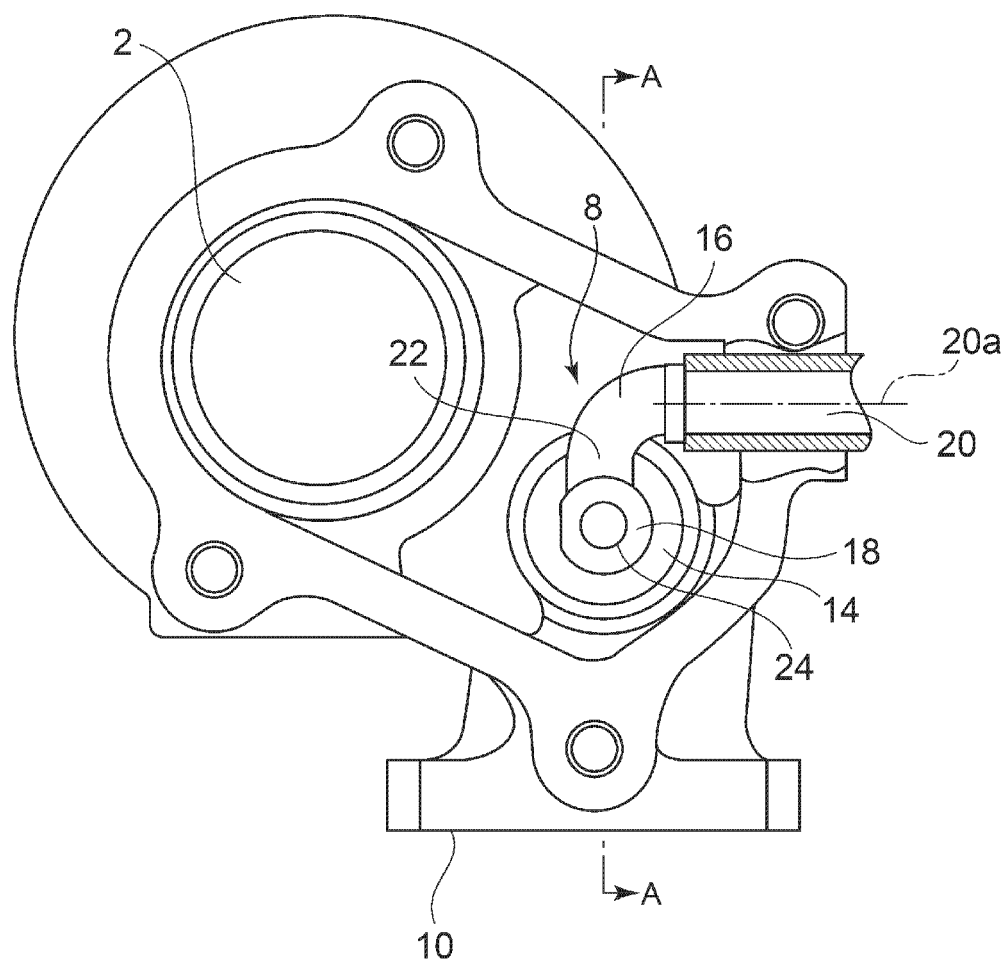
FIG. 2 is a vertical cross-sectional view of a driving part of the waste-gate valve shown in FIG. 1.
Figure 3:
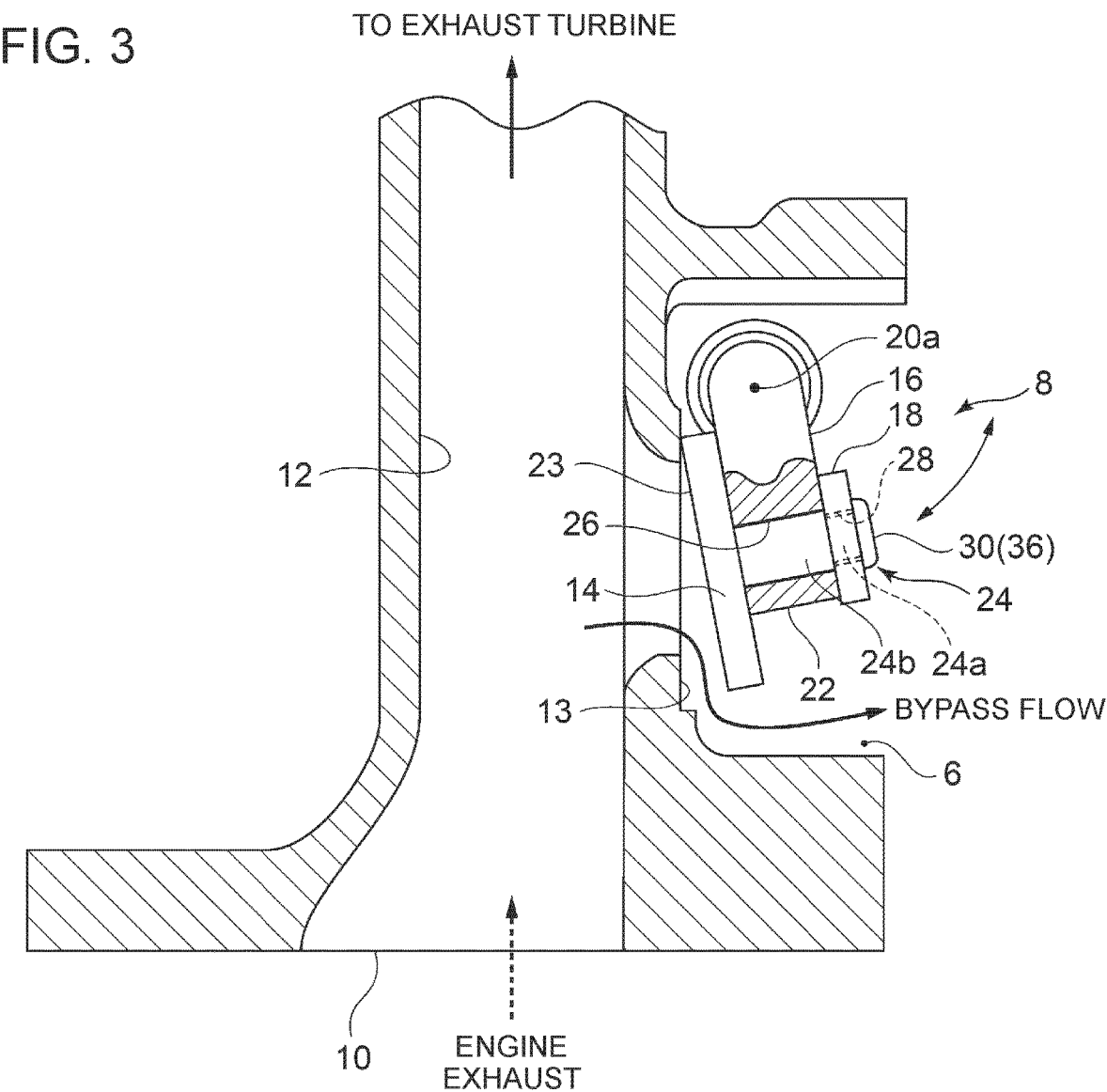
FIG. 3 is a cross-sectional view taken along line A-A in FIG. 2.

FIG. 2 is a vertical cross-sectional view of a driving part of the waste-gate valve 8 shown in FIG. 1. FIG. 3 is a cross-sectional view taken along line A-A in FIG. 2.

As shown in at least one of FIG. 1 or 3, the bypass passage 6 is branched from an exhaust gas passage 12 connecting an exhaust inlet 10 of the turbocharger 100 and the exhaust turbine 2, and exhaust gas parted from the exhaust gas passage 12 bypasses the exhaust turbine 2 to be guided downstream the exhaust turbine 2.

As shown in at least one of FIG. 2 or 3, the waste-gate valve 8 includes a valve body 14 disposed in the bypass passage 6, an open-close lever 16 coupled to the valve body 14 and configured to open and close the bypass passage 6 by moving the valve body 14, and a washer 18 provided so as to nip the open-close lever 16 between the washer 18 and the valve body 14. In an embodiment, as shown in at least one of FIG. 2 or 3, the open-close lever 16 has an L shape, and a support shaft 20 on the root side rotates about the axis 20a, and thereby an operation portion 22 (portion coupled to the valve body 14) on the tip side rotates the valve body 14 about the axis 20a to open and close the bypass passage 6. In the embodiment shown in FIG. 3, the valve body 14 includes a valve main body 23 having a disc shape disposed adjacent and separate from the valve seat 13 (see FIG. 3) disposed in the bypass passage 6, and a valve shaft 24 protruding in a direction opposite to the valve seat 13 from the valve main body 23.

Figure 4:
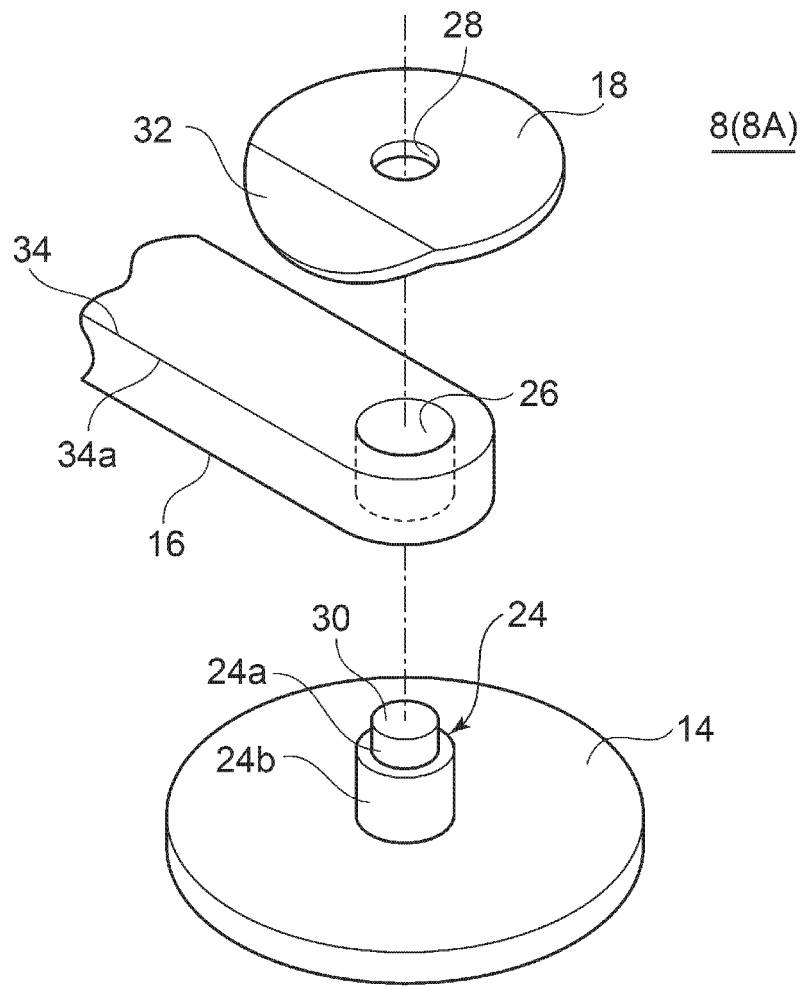
FIG. 4 is an exploded perspective view showing a configuration of the waste-gate valve according to an embodiment, showing a configuration example of the waste-gate valve shown in FIGS. 1 to 3.
Figure 5:
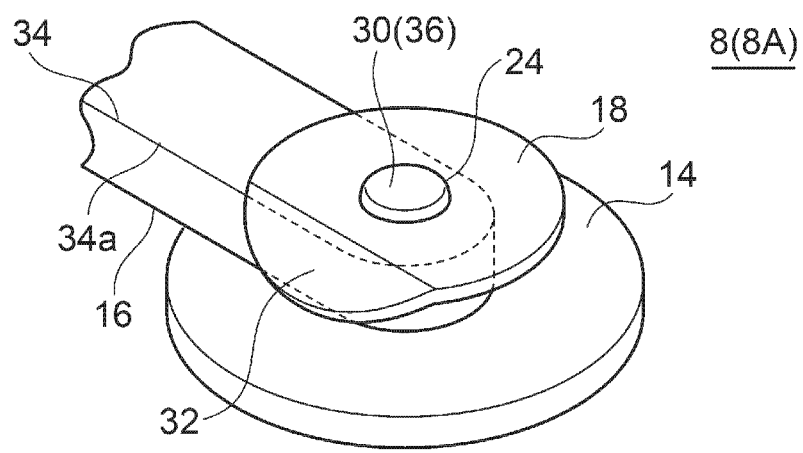
FIG. 5 is an assembly diagram of the waste-gate valve shown in FIG. 4.

FIG. 4 is an exploded perspective view showing a configuration of the waste-gate valve 8 (8A) according to an embodiment, showing a configuration example of the waste-gate valve 8 shown in FIGS. 1 to 3. FIG. 5 is an assembly diagram of the waste-gate valve 8 (8A) shown in FIG. 4.

In some embodiments, as shown in FIGS. 3 and 4 for instance, the open-close lever 16 has an insertion hole 26 (first insertion hole) into which the valve shaft 24 of the valve body 14 is inserted and which engages with the valve shaft 24, while the washer 18 has an insertion hole 28 (second insertion hole) into which the valve shaft 24 is inserted and which is engaged with the valve shaft 24. The insertion hole 28 of the washer 18 is disposed closer to the tip of the valve shaft 24 than the insertion hole 26 of the open-close lever 16, and the hole diameter of the insertion hole 28 is smaller than the hole diameter of the insertion hole 26. Further, the outer diameter of a small diameter portion 24a, of the valve shaft 24, inserted into (engaged with) the insertion hole 28 of the washer 18 is smaller than the outer diameter of a large diameter portion 24b, of the valve shaft 24, inserted into (engaged with) the insertion hole 26 of the open-close lever 16. The washer 18 is fixed to the valve shaft 24 by swaging (or welding) the tip portion 30 of the valve shaft 24.

In an embodiment, as shown in FIGS. 4 and 5, the washer 18 has a bend portion 32 bended along the outer shape of the open-close lever 16. Accordingly, even if vibration of an engine (not shown) and vibration due to exhaust pulsation are transmitted to the valve body 14, the bend portion 32 of the washer 18 fixed to the valve body 14 hangs on the open-close lever 16, and thereby it is possible to restrict rotation of the valve body 14. Furthermore, it is not necessary to form a groove having a rotation stopping surface as described in Patent Document 1 on the open-close lever 16, and thus it is possible to simplify the configuration of the open-close lever 16. Furthermore, in general, the washer 18 can be formed by the drawing process. Thus, for instance, as compared to a case in which a protrusion to hang on the open-close lever 16 is formed on the valve body 14 by precision casting, it is possible to enhance reliability of the product while suppressing an increase in the production costs.

In an embodiment, as shown in FIGS. 4 and 5 for instance, the open-close lever 16 has a corner portion 34 extending in one direction, and the washer 18 is bended along a ridge 34a of the corner portion 34. Accordingly, the bend portion 32 of the washer 18 can hang on the corner portion 34 of the open-close lever 16 more easily, and thereby it is possible to restrict rotation of the valve body 14 effectively.

Figure 6:
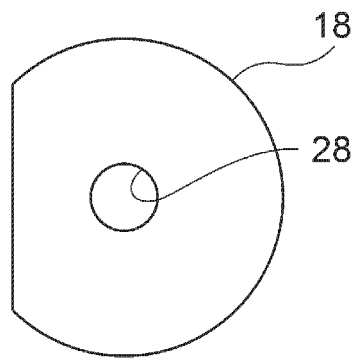
FIG. 6 is a diagram showing an example of the shape of a washer, as seen in the axial direction of an insertion hole of the washer.
Figure 7:
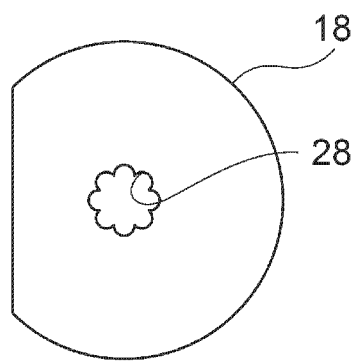
FIG. 7 is a diagram showing an example of the shape of a washer, as seen in the axial direction of an insertion hole of the washer.
Figure 8:
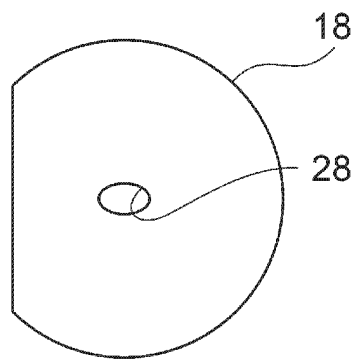
FIG. 8 is a diagram showing an example of the shape of a washer, as seen in the axial direction of an insertion hole of the washer.

In some embodiments, the insertion hole 28 of the washer 18 shown in FIG. 4 may have a circular shape as shown in FIG. 6, or a shape including a serration shape as shown in FIG. 7, or an oval shape as shown in FIG. 8, when seen in the axial direction of the insertion hole 28.

If the insertion hole 28 of the washer 18 has a circular shape as shown in FIG. 6 as seen in the axial direction of the insertion hole 28, it is possible to simplify the configuration of the washer 18.

If the insertion hole 28 of the washer 18 has a non-circular shape as shown in FIGS. 7 and 8 as seen in the axial direction of the insertion hole 28, it is possible to make the tip portion of the valve shaft 24 enter the insertion hole 28 of the washer 18 by swaging the tip portion 30 of the valve shaft 24, and thereby it is possible to improve the strength of a swaging portion 36 (see FIGS. 3 and 5) against torque.

In particular, if the shape of the insertion hole 28 includes a serration shape as shown in FIG. 7, it is possible to make the tip portion 30 of the valve shaft 24 enter the insertion hole 28 of the washer 18 effectively by swaging the tip portion 30 of the valve shaft 24. Accordingly, it is possible to enhance the effect to improve the strength of the swaging portion 36 (see FIGS. 3 and 5) against torque.

Figure 9:
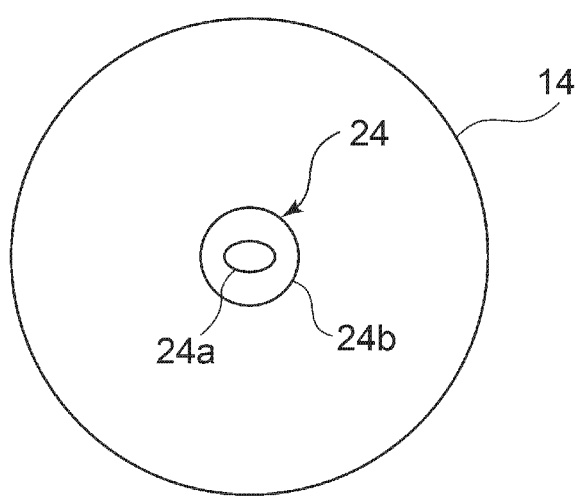
FIG. 9 is a diagram showing an example of the shape of a valve body, as seen in the axial direction of a valve shaft.

Furthermore, if the shape of the insertion hole 28 is an oval shape shown in FIG. 8, the small diameter portion 24a of the valve shaft 24, which is to be inserted into the insertion hole 28 of the washer 18 may have a shape corresponding to that of the insertion hole 28. That is, as shown in FIG. 9, the small diameter portion 24a of the valve shaft 24, which is to be inserted into the insertion hole 28 of the washer 18, may have an oval shape as seen in the axial direction of the valve shaft 24. Accordingly, it is possible to make the tip portion 30 of the valve shaft 24 enter the insertion hole 28 of the washer 18 effectively, and thereby it is possible to enhance the effect to improve the strength of the swaging portion 36 against torque.

Figure 10:
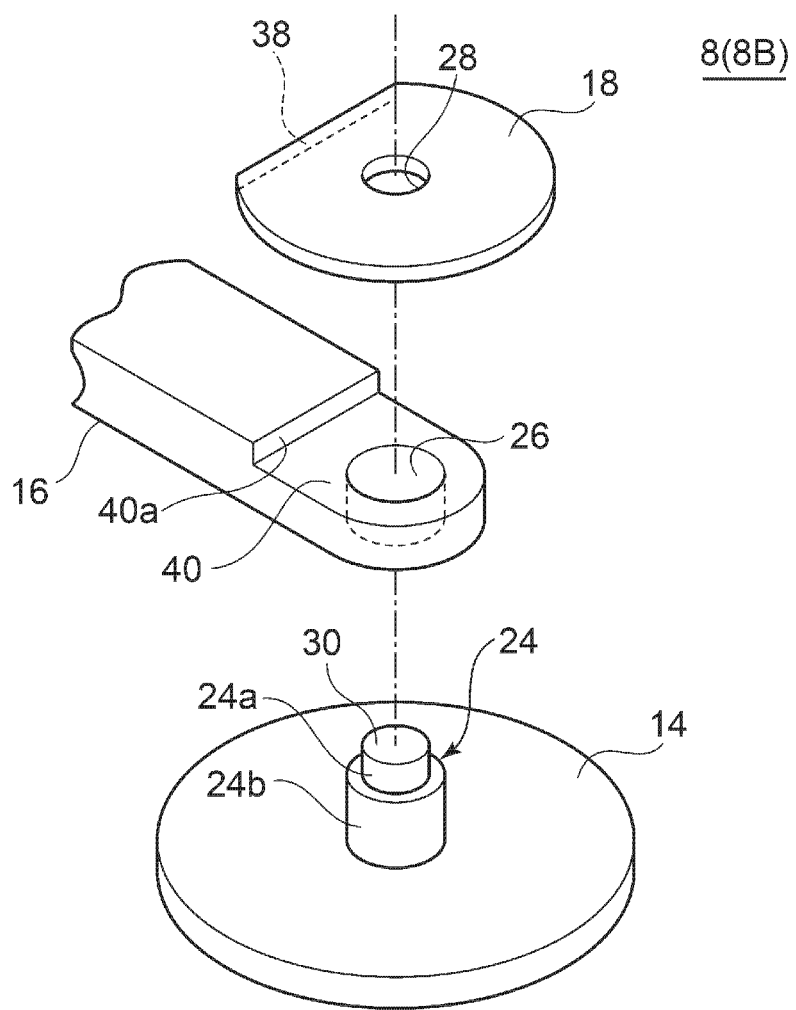
FIG. 10 is an exploded perspective view showing a configuration of the waste-gate valve according to a reference embodiment, showing a configuration example of the waste-gate valve shown in FIGS. 1 to 3.
Figure 11:
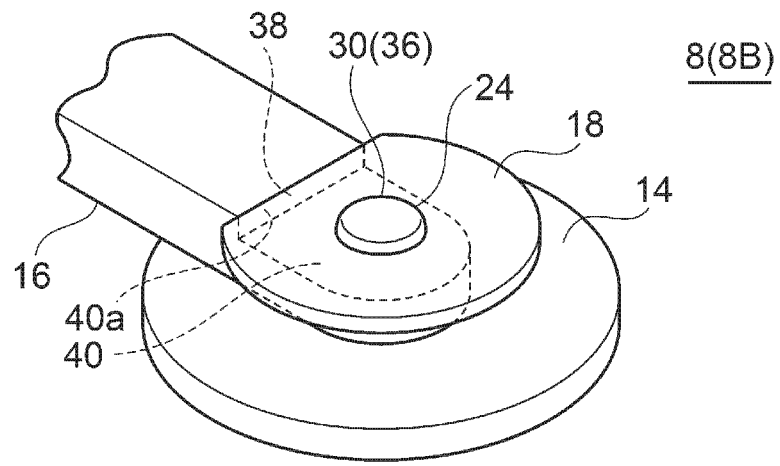
FIG. 11 is an assembly diagram of the waste-gate valve shown in FIG. 10.

FIG. 10 is an exploded perspective view showing a configuration of the waste-gate valve 8 (8B) according to a reference embodiment, showing a configuration example of the waste-gate valve 8 shown in FIGS. 1 to 3. FIG. 11 is an assembly diagram of the waste-gate valve 8 (8B) shown in FIG. 10.

In a reference embodiment, as shown in FIGS. 10 and 11, the open-close lever 16 has a step portion 40a on a surface 40 on the side closer to the washer 18. In this case, the washer 18 has a side surface 38 formed to restrict rotation of the washer 18 about the axis of the valve shaft 24 by making contact with the step portion 40a. Accordingly, even if vibration of an engine (not shown) and vibration due to exhaust pulsation are transmitted to the valve body 14, the side surface 38 of the washer 18 makes contact with the step portion 40a of the open-close lever 16, and thereby it is possible to restrict rotation of the valve body 14 fixed to the washer 18. Furthermore, in general, the washer 18 can be formed by the drawing process. Thus, for instance, as compared to a case in which a protrusion to hang on the open-close lever is formed on the valve body by precision casting, it is possible to enhance reliability of the product while suppressing an increase in the production costs. The washer 18 shown in FIGS. 10 and 11 has a so called D-cut shape, and the side surface 38 of the washer 18 can be formed easily by cutting the washer 18 having an annular shape along a plane parallel to the axis of the insertion hole 28.

In some reference embodiments, the insertion hole 28 of the washer 18 shown in FIGS. 10 and 11 may have a circular shape as shown in FIG. 6, or a shape including a serration shape as shown in FIG. 7, or an oval shape as shown in FIG. 8, as seen in the axial direction of the insertion hole 28.

If the insertion hole 28 has a circular shape as shown in FIG. 6 in the axial direction of the insertion hole 28 of the washer 18, it is possible to simplify the configuration of the washer 18.

If the insertion hole 28 of the washer has a non-circular shape as shown in FIGS. 7 and 8 as seen in the axial direction of the insertion hole 28, it is possible to make the tip portion of the valve shaft 24 enter the insertion hole of the washer by swaging the tip portion 30 of the valve shaft 24, and thereby it is possible to improve the strength of the swaging portion 36 (see FIGS. 3 and 11) against torque.

In particular, if the shape of the insertion hole 28 includes a serration shape as shown in FIG. 7, it is possible to make the tip portion 30 of the valve shaft 24 enter the insertion hole 28 of the washer 18 effectively by swaging the tip portion 30 of the valve shaft 24. Accordingly, it is possible to enhance the effect to improve the strength of the swaging portion 36 (see FIGS. 3 and 11) against torque.

Furthermore, if the shape of the insertion hole 28 is an oval shape shown in FIG. 8, the small diameter portion 24a of the valve shaft 24, which is to be inserted into the insertion hole 28 of the washer 18, may have a shape corresponding to that of the insertion hole 28. That is, as shown in FIG. 9, the small diameter portion 24a of the valve shaft 24, which is to be inserted into the insertion hole 28 of the washer 18, may have an oval shape as seen in the axial direction of the valve shaft 24. Accordingly, it is possible to make the tip portion 30 of the valve shaft 24 enter the insertion hole 28 of the washer 18 effectively, and thereby it is possible to enhance the effect to improve the strength of the swaging portion 36 (see FIGS. 3 and 11) against torque.

Figure 12:
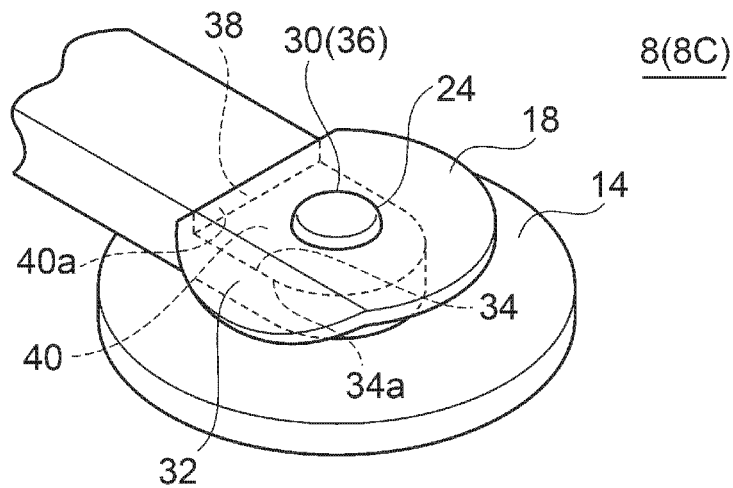
FIG. 12 is an assembly diagram showing a waste-gate valve according to an embodiment, showing a configuration example of the waste-gate valve shown in FIGS. 1 to 3.

FIG. 12 is an assembly diagram showing a waste-gate valve 8 (8C) according to an embodiment, showing a configuration example of the waste-gate valve 8 shown in FIGS. 1 to 3. The waste-gate valve 8 (8C) shown in FIG. 12 is different from the waste-gate valve 8 (8B) in the reference embodiment shown in FIGS. 10 and 11 only in the shape of the washer 18, and otherwise have the same configuration.

In the embodiment shown in FIG. 12, the washer 18 has a bend portion 32 bended along the outer shape of the open-close lever 16. Accordingly, even if vibration of an engine and vibration due to exhaust pulsation are transmitted to the valve body 14, the bend portion 32 of the washer 18 fixed to the valve body 14 hangs on the open-close lever 16, and thereby it is possible to restrict rotation of the valve body 14. Furthermore, the open-close lever 16 shown in FIG. 12 has a corner portion 34 extending in one direction, and the washer 18 is bended along a ridge of the corner portion 34. Accordingly, the bend portion 32 of the washer 18 can hang on the corner portion 34 of the open-close lever 16 more easily, and thereby it is possible to restrict rotation of the valve body 14 effectively.

Figure 13:
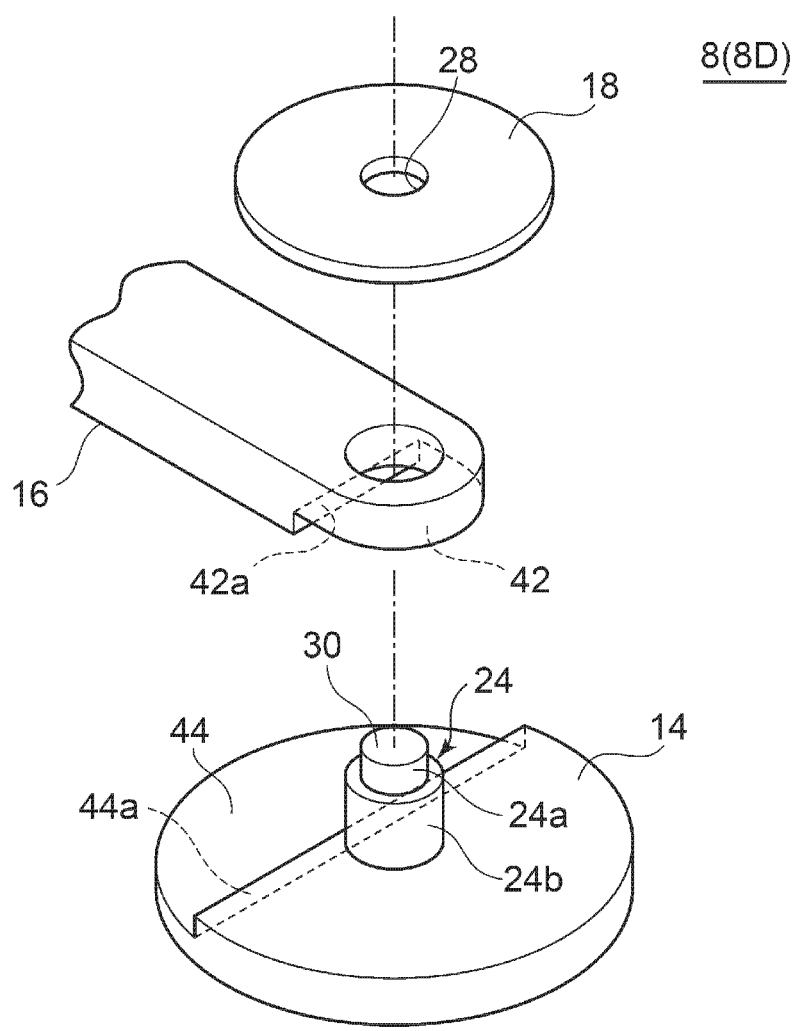
FIG. 13 is an exploded perspective view showing a configuration of the waste-gate valve according to a reference embodiment, showing a configuration example of the waste-gate valve shown in FIGS. 1 to 3.
Figure 14:
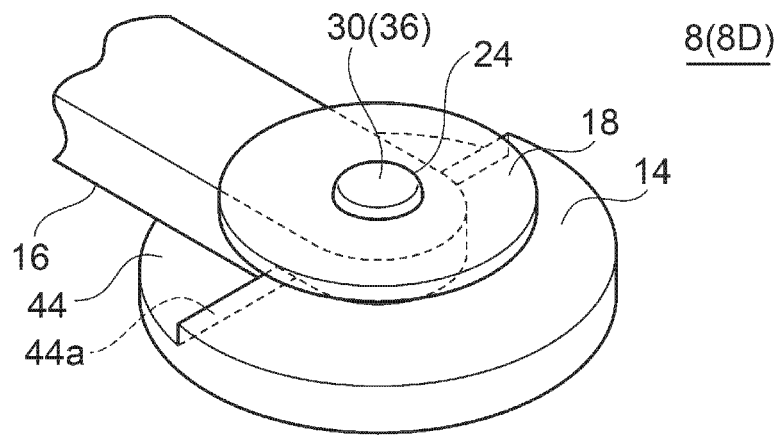
FIG. 14 is an assembly diagram of the waste-gate valve shown in FIG. 13.

FIG. 13 is an exploded perspective view showing a configuration of the waste-gate valve 8 (8D) according to a reference embodiment, showing a configuration example of the waste-gate valve 8 shown in FIGS. 1 to 3. FIG. 14 is an assembly diagram of the waste-gate valve 8 (8D) shown in FIG. 13.

In a reference embodiment, as shown in at least one of FIG. 13 or 14, the open-close lever 16 has a step portion 42a on a surface 42 on the side closer to the valve body 14, and the valve body 14 has a step portion 44a to face the step portion 42a of the open-close lever 16, on a surface 44 on the side closer to the open-close lever 16. The step portion 42a of the valve body 14 is formed so as to restrict rotation of the valve body 14 about the axis of the valve shaft 24 by making contact with the step portion 44a of the open-close lever 16.

Accordingly, even if vibration of an engine (not shown) and vibration due to exhaust pulsation are transmitted to the valve body 14, the step portion 44a of the valve body 14 makes contact with the step portion 42a of the open-close lever 16, and thereby it is possible to restrict rotation of the valve body 14. Further, with this configuration, an increase in torque applied to the connection part between the valve shaft 24 and the washer is suppressed, and thus it is possible to suppress breakage of the swaging portion 36 (see FIGS. 3 and 14) due to torque in a case where the tip portion 30 of the valve shaft 24 is fixed to the washer 18 by swaging. Furthermore, the step portion 44a of the valve body 14 can be formed easily by a cutting process on the valve body 14. Thus, for instance, as compared to a case in which a protrusion to hang on the open-close lever is formed on the valve body by precision casting, it is possible to enhance reliability of the product while suppressing an increase in the production costs.

Figure 15:
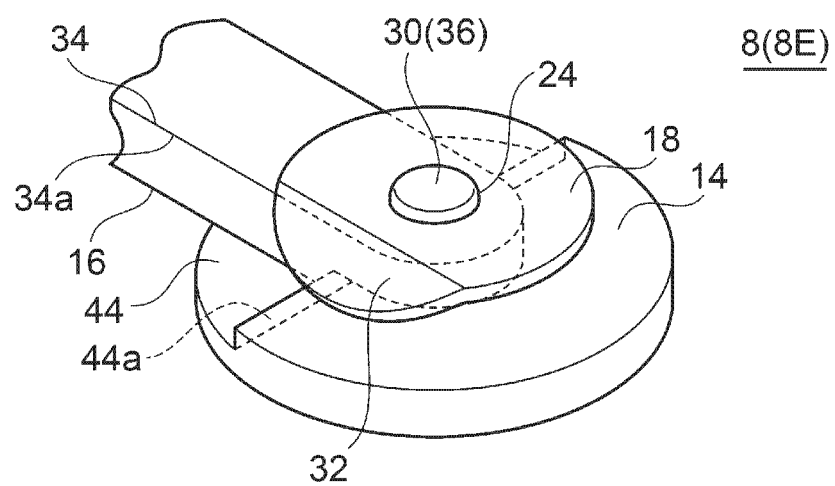
FIG. 15 is an assembly diagram showing a waste-gate valve according to an embodiment, showing a configuration example of the waste-gate valve shown in FIGS. 1 to 3.

FIG. 15 is an assembly diagram showing a waste-gate valve 8 (8E) according to an embodiment, showing a configuration example of the waste-gate valve 8 shown in FIGS. 1 to 3. The waste-gate valve 8 (8E) shown in FIG. 15 is different from the waste-gate valve 8 (8D) in the reference embodiment shown in FIGS. 13 and 14 only in the shape of the washer 18, and otherwise have the same configuration.

In the embodiment shown in FIG. 15, the washer 18 has a bend portion 32 bended along the outer shape of the open-close lever 16. Accordingly, even if vibration of an engine and vibration due to exhaust pulsation are transmitted to the valve body 14, the bend portion 32 of the washer 18 fixed to the valve body 14 hangs on the open-close lever 16, and thereby it is possible to restrict rotation of the valve body 14. Furthermore, the open-close lever 16 shown in FIG. 15 has a corner portion 34 extending in one direction, and the washer 18 is bended along a ridge 34a of the corner portion 34. Accordingly, the bend portion 32 of the washer 18 can hang on the corner portion 34 of the open-close lever 16 more easily, and thereby it is possible to restrict rotation of the valve body 14 effectively.

Embodiments of the present invention were described in detail above, but the present invention is not limited thereto, and various amendments and modifications may be implemented.

DESCRIPTION OF REFERENCE NUMERALS

2 Exhaust turbine
4 Compressor
6 Bypass passage
8 Waste-gate valve
10 Exhaust inlet
12 Exhaust gas passage
13 Valve seat
14 Valve body
16 Open-close lever
18 Washer
20 Support shaft
20a Axis
22 Operation portion
23 Valve main body
24 Valve shaft
24a Small diameter portion
24b Large diameter portion
26 Insertion hole (first insertion hole)
28 Insertion hole (second insertion hole)
30 Tip portion
32 Bend portion
34 Corner portion
34a Ridge
36 Swaging portion
38 Side surface
40 Surface on washer side
40a Step portion
42 Surface on valve body side
42a Step portion
44 Surface on open-close lever side
44a Step portion
100 Turbocharger

The invention claimed is:

1. A waste-gate valve for opening and closing a bypass passage which bypasses an exhaust turbine of a turbocharger, the waste-gate valve comprising:
a valve body disposed in the bypass passage;
an open-close lever having a first insertion hole into which a valve shaft of the valve body is inserted, and being configured to open and close the bypass passage by moving the valve body; and
a washer having a second insertion hole which is positioned closer to a tip of the valve shaft than the first insertion hole and into which the valve shaft is inserted, the washer being fixed to the valve shaft;
wherein the washer is fixed to the valve shaft by swaging a tip portion of the valve shaft;
wherein the open-close lever has a step portion on a surface adjacent to the valve body; and
wherein the valve body has a step portion on a surface adjacent to the open-close lever;
wherein the step portion of the valve body is facing the step portion of the open-close lever; and
wherein the step portion of the valve body is formed so as to restrict rotation of the valve body, about an axis of the valve shaft by making contact with the step portion of the open-close lever.

2. A turbocharger, comprising:
an exhaust turbine configured to be rotated by exhaust gas of an engine;
a compressor configured to be driven by the exhaust turbine and compress intake air of the engine; and
a waste-gate valve for opening and closing a bypass passage which bypasses an exhaust turbine of a turbocharger, the waste-gate valve comprising:
a valve body disposed in the bypass passage;
an open-close lever having a first insertion hole into which a valve shaft of the valve body is inserted, and being configured to open and close the bypass passage by moving the valve body; and
a washer having a second insertion hole which is positioned closer to a tip of the valve shaft than the first insertion hole and into which the valve shaft is inserted, the washer being fixed to the valve shaft;
wherein the washer is fixed to the valve shaft by swaging a tip portion of the valve shaft;
wherein the open-close lever has a step portion on a surface adjacent to the valve body; and
wherein the valve body has a step portion on a surface adjacent to the open-close lever;
wherein the step portion of the valve body is facing the step portion of the open-close lever; and
wherein the step portion of the valve body is formed so as to restrict rotation of the valve body about an axis of the valve shalt by making contact with the step portion of the open-close lever.

* * * * *